(12) United States Patent
Bhalerao et al.

(10) Patent No.: US 8,326,595 B2
(45) Date of Patent: Dec. 4, 2012

(54) MECHANISM FOR IDENTIFYING INVALID SYLLABLES IN DEVANAGARI SCRIPT

(75) Inventors: Rahul Pandit Bhalerao, Maharashtra (IN); Pravin Dinkar Satpute, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 419 days.

(21) Appl. No.: 12/612,649

(22) Filed: Nov. 4, 2009

(65) Prior Publication Data
US 2011/0054882 A1 Mar. 3, 2011

(30) Foreign Application Priority Data
Aug. 31, 2009 (IN) .......................... 2103/CHE/2009

(51) Int. Cl.
*G06F 17/22* (2006.01)
(52) U.S. Cl. ................. 704/1; 704/8; 715/257; 715/262
(58) Field of Classification Search .................. 704/1, 2, 704/8; 715/256, 257, 262, 264
See application file for complete search history.

(56) References Cited

U.S. PATENT DOCUMENTS

| | | | | |
|---|---|---|---|---|
| 4,406,626 | A * | 9/1983 | Anderson et al. | 704/270 |
| 6,005,498 | A * | 12/1999 | Yang et al. | 341/23 |
| 6,869,018 | B2 * | 3/2005 | Fifield et al. | 235/487 |
| 7,143,350 | B2 * | 11/2006 | Jurion et al. | 715/257 |
| 7,702,502 | B2 * | 4/2010 | Ricci et al. | 704/205 |
| 7,930,642 | B1 * | 4/2011 | Gerde et al. | 715/764 |
| 2003/0119551 | A1 * | 6/2003 | Laukkanen et al. | 455/556 |
| 2003/0202832 | A1 * | 10/2003 | Lorenzo | 400/103 |
| 2005/0195171 | A1 * | 9/2005 | Aoki et al. | 345/172 |
| 2005/0283726 | A1 * | 12/2005 | Lunati | 715/533 |
| 2006/0126936 | A1 * | 6/2006 | Bhaskarabhatla | 382/187 |
| 2006/0217955 | A1 * | 9/2006 | Nagao et al. | 704/2 |
| 2006/0236237 | A1 * | 10/2006 | Peiro et al. | 715/530 |
| 2007/0033035 | A1 * | 2/2007 | Sharma et al. | 704/245 |
| 2009/0172522 | A1 * | 7/2009 | Ichikawa | 715/256 |
| 2009/0260060 | A1 * | 10/2009 | Smith et al. | 726/3 |
| 2010/0262418 | A1 * | 10/2010 | Musa | 704/2 |
| 2011/0054881 | A1 * | 3/2011 | Bhalerao | 704/2 |
| 2012/0053926 | A1 * | 3/2012 | Satpute | 704/8 |

OTHER PUBLICATIONS

Veena Dixit et al., "Design and Implementation of a Morphology-based Spellchecker for Marathi, an Indian Language", 6 pages, Oct. 2005, Archives of Control Sciences, vol. 15, No. 3, Special issue on Human Language Technologies as a challenge for Computer Science and Linguistics. Part I.

* cited by examiner

*Primary Examiner* — Martin Lerner
(74) *Attorney, Agent, or Firm* — Lowenstein Sandler PC (57) ABSTRACT

A mechanism for identifying invalid syllables in Devanagari script is disclosed. A method of embodiments of the invention includes receiving Devanagari text from an application of a computing device for parsing, determining a character type for a character of the Devanagari text, determining a new state associated with the character by referencing a Devanagari state machine with the determined character type and a current state of the Devanagari text, and transmitting an invalid syllable signal to the application for display on a display device to an end user of the application if the determined new state is invalid.

17 Claims, 6 Drawing Sheets

Fig. 1

| State No. | State/Character Type Name | List of Characters/Comments |
|---|---|---|
| 0 | INIT | Initial state in the run of text |
| 1 | Matra | ा, ि, ी, ु, ू, ृ, ॄ, ॢ, ॣ, े, ै, ो, ौ, ॅ, ॉ |
| 2 | Vowel | अ, आ, इ, ई, उ, ऊ, ऋ, ॠ, ऌ, ॡ, ए, ऐ, ओ, औ, ऍ, ऑ, अँ |
| 3 | VowelModifier | ं, ः, ँ |
| 4 | Halant | ् |
| 5 | Nukta | ़ |
| 6 | Consonant | क, ख, ग, घ, ङ, च, छ, ज, झ, ञ, ट, ठ, ड, ढ, ण, त, थ, द, ध, न, प, फ, ब, भ, म, य, र, ल, ळ, व, श, ष, स, ह, ऩ, ऱ, ऴ |
| 7 | INVALID | The current syllable is invalid |

```
matrix = [ [2, 7, 2, 7, 7, 7, 6], #0 init
           [2, 7, 2, 3, 7, 7, 6], #1 Matra
           [2, 7, 2, 3, 7, 7, 6], #2 Vowel
           [2, 7, 2, 7, 7, 7, 6], #3 Vowel Modifier
           [2, 7, 7, 7, 7, 7, 6], #4 Halant
           [2, 1, 2, 3, 4, 7, 6], #5 Nukta
           [2, 1, 2, 3, 4, 5, 6], #6 Consonant
           [2, 7, 2, 7, 7, 7, 6], #7 Invalid
         ]
           (0)  (1)   (2)   (3)  (4)    (5)   (6)
           Init Matra Vowel VM   Halant Nukta Consonant
```

MECHANISM FOR IDENTIFYING INVALID SYLLABLES IN DEVANAGARI SCRIPT

RELATED APPLICATION

This application claims the benefit of priority to Indian Patent Application Number 2103/CHEN/2009, filed on Aug. 31, 2009, which is incorporated herein by reference in its entirety.

TECHNICAL FIELD

The embodiments of the invention relate generally to language conversion in computing applications and, more specifically, relate to a mechanism for identifying invalid syllables in Devanagari script.

BACKGROUND

Language localization is the process of translating a product into different languages or adapting a language for a specific country or region. In the global market existing today, language localization is one of the most important features for any computing application.

One current problem encountered in localization solutions is in the use of Devanagari script on computing devices having a Unicode encoding standard. Often times, users of Devanagari script do not input the proper sequence of characters to form syllables. Typically such typos are due to either a typing mistake or to lack of knowledge related to the use of different Devanagari keyboard layouts. Typos in Devanagari script are very common because, in many cases, the logical sequence of the characters in Devanagari differs from the physical sequence.

Presently, no solutions exist that can computationally search and locate the positions of invalid Devanagari syllables in a platform-independent, plain text-based, simple and reusable method. The only alternatives available are a manual search or a dictionary look-up, both of which are neither adequate nor accurate. One possible solution is to utilize switch cases by conditioning each and every type of character combination. However, such a solution is tedious and inaccurate as the number of cases compared will always be limited. As a result, an application-independent, text-based method to automatically search for invalid syllables in Devanagari script so that they can be marked, highlighted, and/or asked for replacement automatically would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for identifying invalid syllables in Devanagari script. A method of embodiments of the invention includes receiving Devanagari text from an application of a computing device for parsing, determining a character type for a character of the Devanagari text, determining a new state associated with the character by referencing a Devanagari state machine with the determined character type and a current state of the Devanagari text, and transmitting an invalid syllable signal to the application for display on a display device to an end user of the application if the determined new state is invalid.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for identifying invalid syllables in Devanagari script. Embodiments of the invention automatically identify invalid Devanagari syllables by implementing a state machine of the Devanagari character types and the state of the current text. Based on a current state of the text, the state machine determines which characters are allowed to follow next and which characters would result in an invalid state. Once an invalid syllable is determined, embodiments of the invention continue to search through the text for any additional invalid syllables without requiring correction of the previously-identified invalid syllables. Furthermore, the state machine of embodiments of the invention is implemented using a minimal set of Devanagari characters, resulting in a more efficient method of determining invalid Devanagari syllables.

Figure 1:
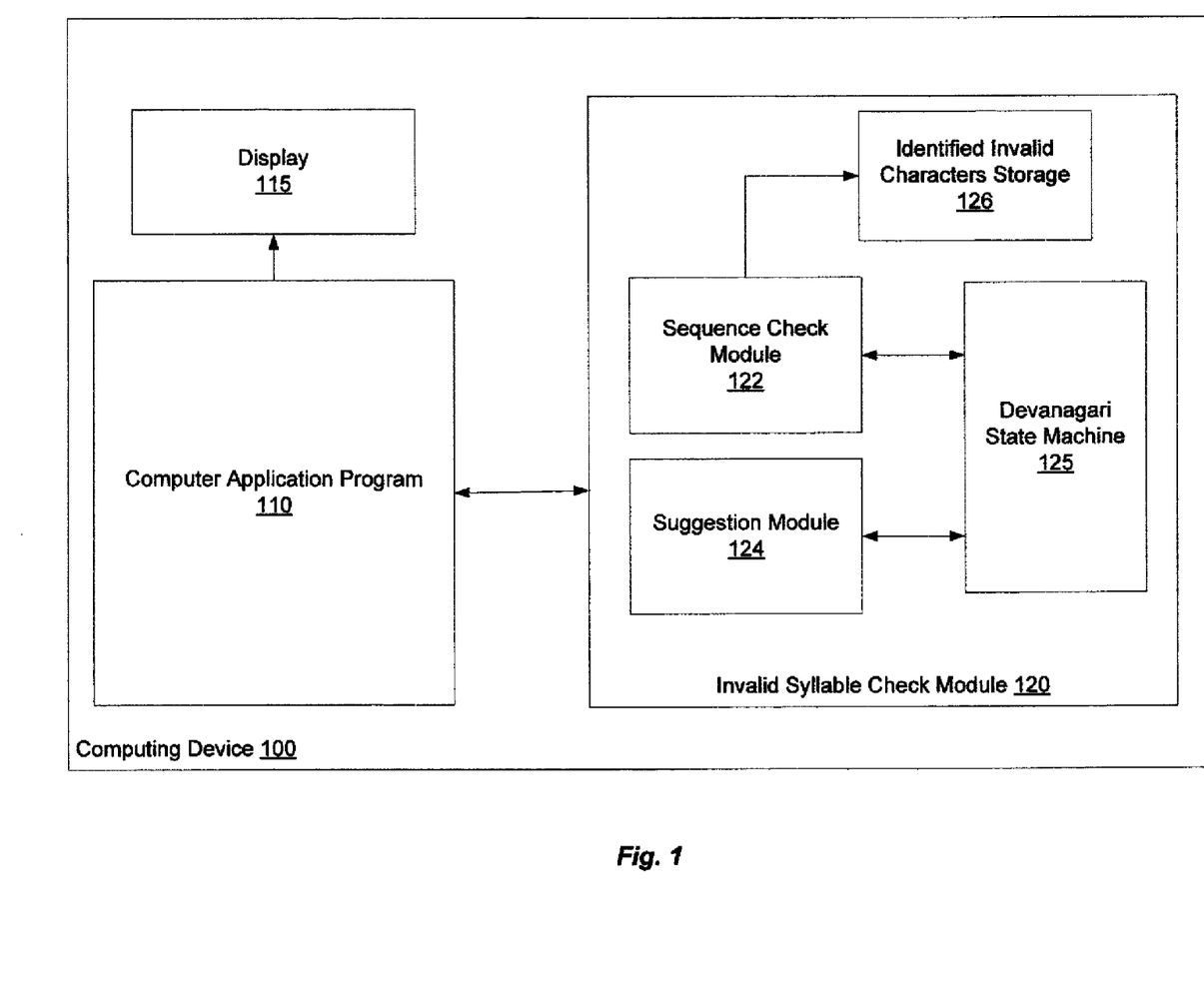
FIG. 1 is a block diagram of a computing device to identify invalid syllables in Devanagari script according to an embodiment of the invention.

FIG. 1 is a block diagram of a computing device 100 to identify invalid syllables in Devanagari script according to an embodiment of the invention. Although not shown, computing device 100 includes hardware such as a processor and memory to implement the functionality of its system. Computing device 100 includes a computer application program 110 that, in one embodiment, may implement the functionality of a word processing program, for example. However, embodiments of the invention are not solely limited to such an implementation of computer application program 110.

In one embodiment, computer application program 110 utilizes an invalid syllable check module 120 in order to identify invalid Devanagari syllables in text inputted to the computer application program 110. Sequence check module 122 utilizes a Devanagari state machine 125 to determine invalid syllables in the text of the computer application program 110 and stores these identified syllables, or data related to the identified syllables, in the identified invalid character storage 126.

In one embodiment, the identified invalid Devanagari syllables from the text may be provided from storage 126 to an end user of the computer application program 110 via display 115. In some embodiments, the identified invalid Devanagari syllables may be shown to the end user while invalid syllable check module 120 is parsing the text. In other embodiments, the identified invalid Devanagari syllables are shown to the end user after all parsing has been completed. Additionally, in some embodiments, suggestion module 124 may utilize Devanagari state machine 125 to provide suggested corrections to the identified invalid Devanagari text.

As described above, the text inputted to the computer application program 110 originates from an end user that is utilizing the computer application program and is providing the text in Devanagari script. In Devanagari script there are 6 types of characters present:

(1) Matra;
(2) Vowel;
(3) Vowel Modifier;
(4) Halant;
(5) Nukta; and
(6) Consonant.

In the following description, for ease of explanation, the above Devanagari characters will be referred to by either their names and/or the given index number. In Devanagari, the order in which characters follow each other is very important and an illogical order will result in an invalid syllable. For example, a Matra (1), which can also be called an independent vowel, can only follow a Consonant (6). Also, there cannot be a Matra (1) followed by another Matra (1). Vowels (2) cannot be combined with any Matras (1). But, both Vowels (2) and Consonants (6) can be followed by a Vowel Modifier (3). There are also specific rules for physical display of Devanagari characters that differ from the logical order of the characters. For instance, the character 'Devanagari Vowel Sign I' which has Unicode representation 'U+093F', and is of the type Matra (1), is always placed to the left side of a Consonant (6) in its physical order (i.e., display order), but logically every Matra (1) is preceded by the Consonant (6).

Thus, in Devanagari, there are many ordering rules, as well as differences between logical and physical order of characters, that can result in many typos in the text of computer application program 110. Considering all such properties of the Devanagari script, embodiments of the invention provide a mechanism that can scan through inputted Devanagari text of computer application program 110 and determine if any syllable in the Devanagari text is valid or invalid.

To identify invalid Devanagari syllables, computer application program 110 accesses invalid syllable check module 120. Sequence check module 122 receives the text input to computer application program 110 and parses through the text to identify invalid syllables using Devanagari state machine 125. Devanagari state machine 125 models rules of Devanagari script by implementing the character types detailed above (as well as an initial state and an invalid state) as various states of the current text in the state machine 125. For example, if the current state of the text is Vowel (2), the rules of Devanagari script (as modeled in state machine 125) dictate that there can only be certain characters that can follow it. If any other type is the next character, then the state changes to an 'invalid' state. Also depending upon the following next character, the new state will be determined in state machine 125.

Figure 2:
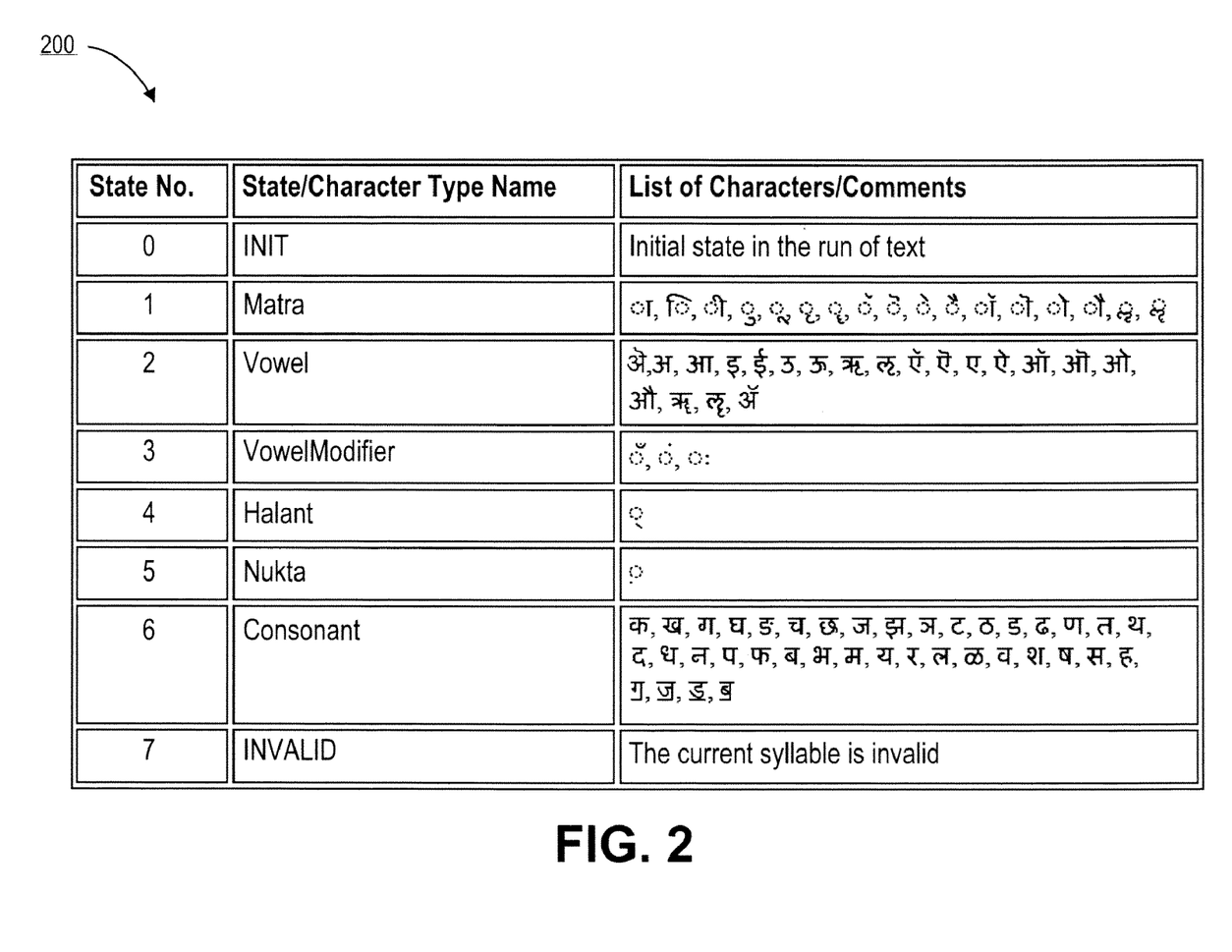
FIG. 2 is a diagram depicting a table that defines the states and character types for Devanagari text according to an embodiment of the invention.

FIG. 2 depicts a table 200 that defines the states and character types for Devanagari text. One skilled in the art will appreciate that the list of characters found in table 200 is only for reference and is according to the Unicode Standard 5.1.

Embodiments of the invention depend on either the character types or the states as detailed in table 200. As discussed above, embodiments of the invention accommodate all of the Devanagari script rules regarding valid or invalid syllables by implementing a state machine 125.

Figure 3:
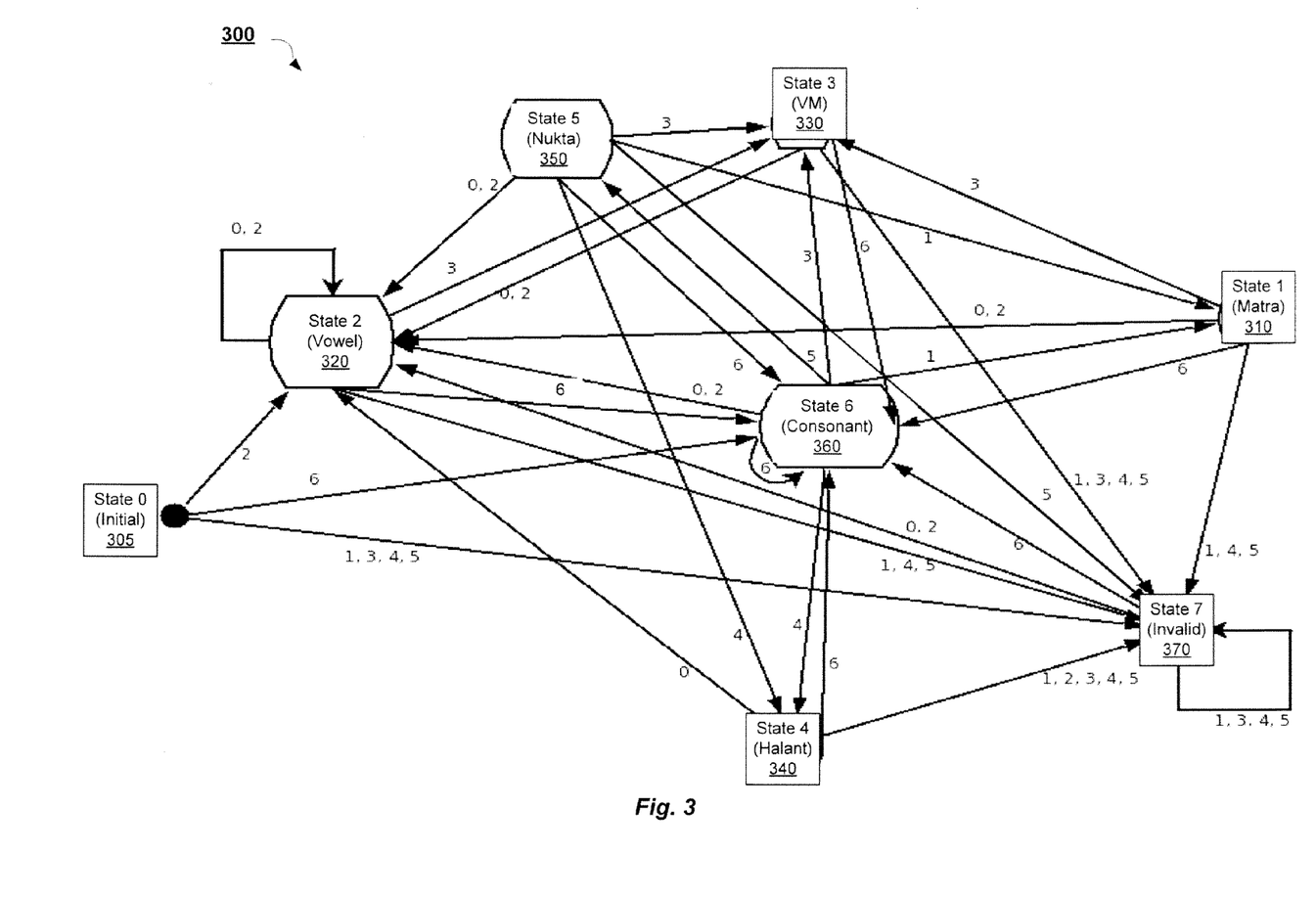
FIG. 3 is a diagram depicting a Devanagari state machine for identifying invalid Devanagari syllables according to an embodiment of the invention.

FIG. 3 is a diagram depicting a Devanagari state machine for identifying invalid Devanagari syllables according to an embodiment of the invention. In one embodiment, state machine 300 is the same as Devanagari state machine 125 described with respect to FIG. 1. In state machine 300, each node 310-370 represents the current state of the Devanagari text. The arrows between states 310-370 represent the state transitions. The numbers written on the arrows denote the character type of the following text. For example, if the text is currently in State 0 (Initial) 305, and the next character in the text run is of type 2 (e.g., Vowel (2)), then the state transition occurs and the state changes to State 2 (Vowel) 320.

Figure 4:
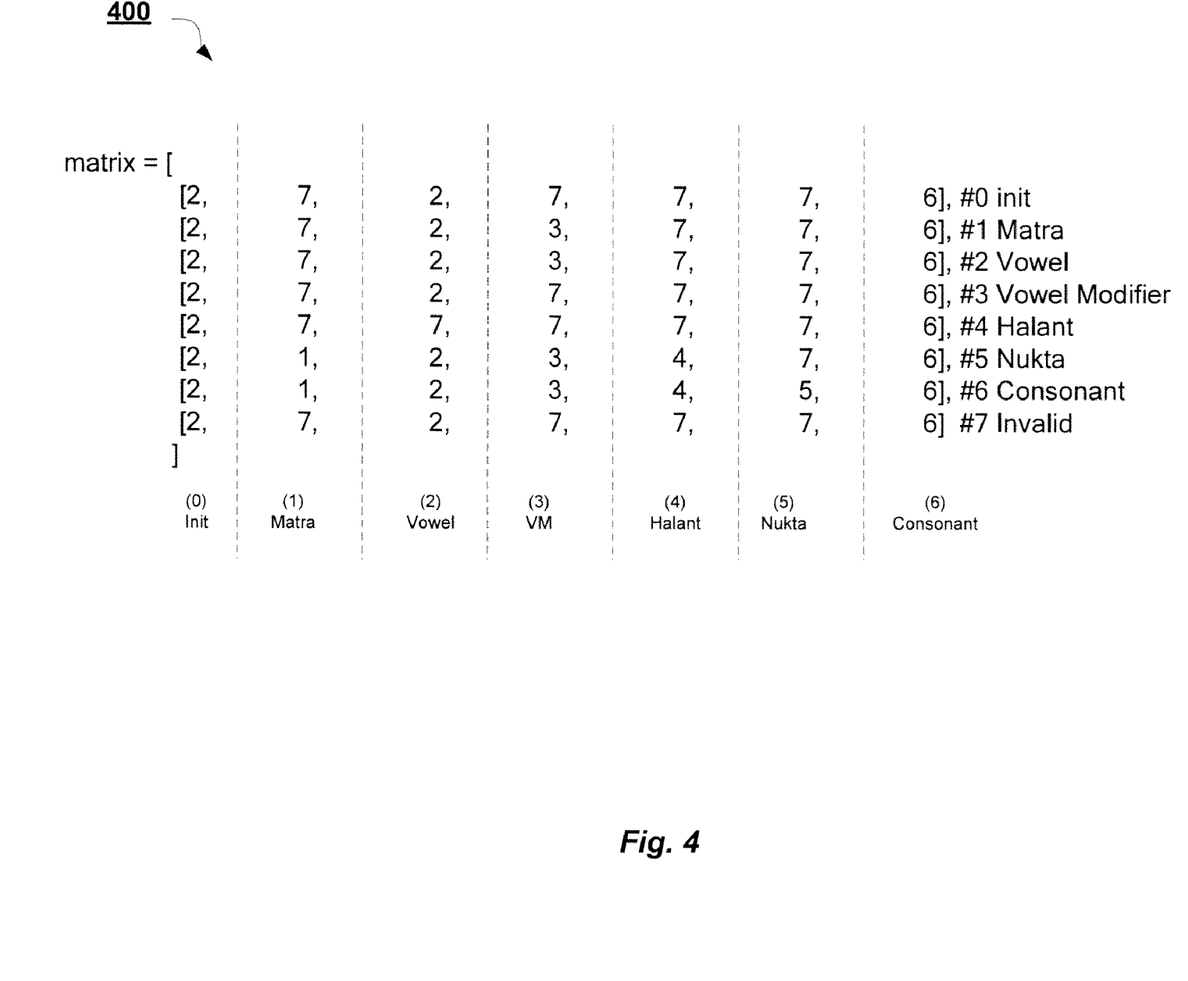
FIG. 4 is a diagram depicting a matrix that implements a Devanagari state machine according to an embodiment of the invention.
Figure 5:
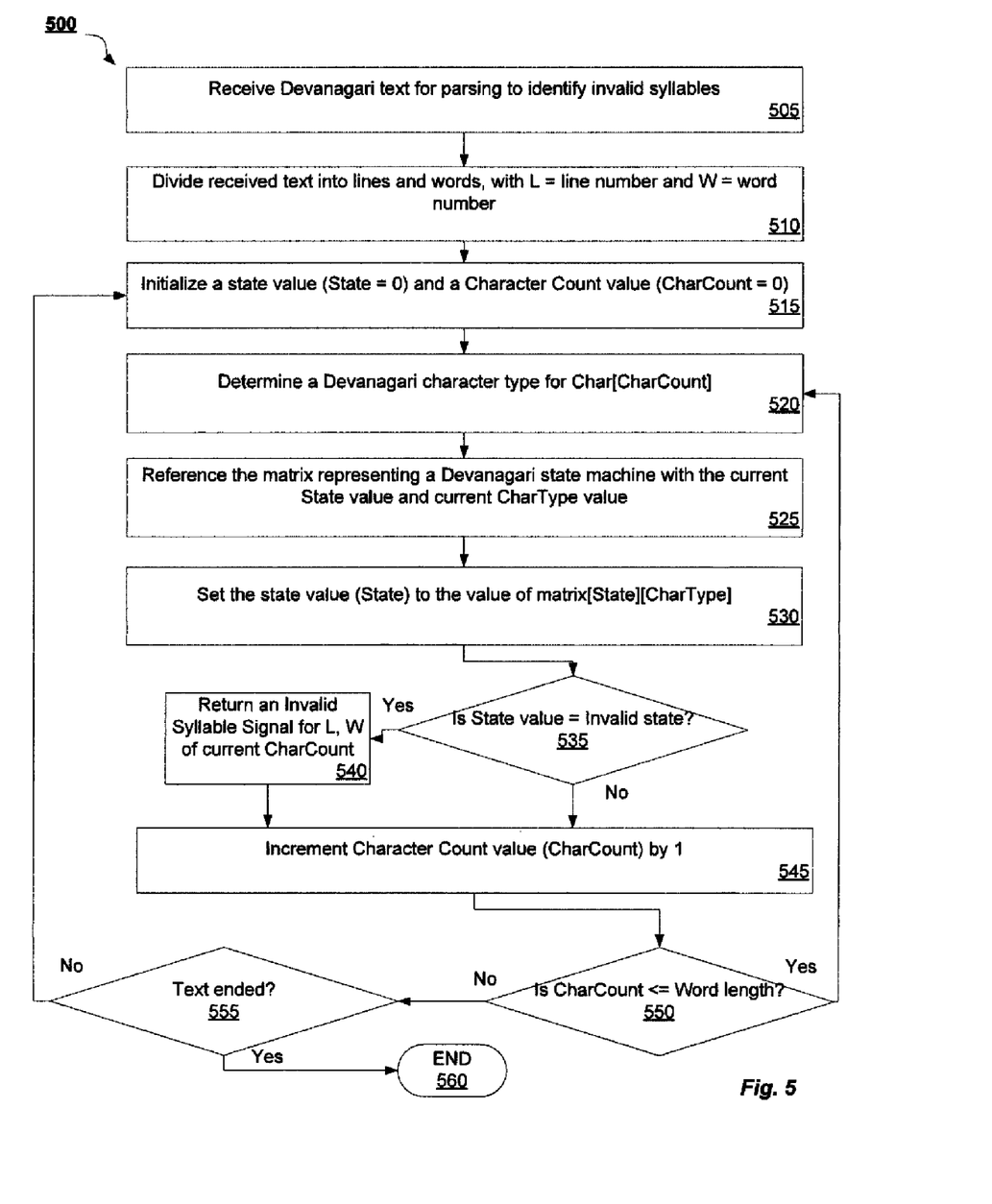
FIG. 5 is a flow diagram illustrating a method to locate invalid Devanagari syllables using a state machine according to embodiments of the invention.

FIG. 5 is a flow diagram illustrating a method 500 to locate invalid Devanagari syllables using a state machine according to embodiments of the invention. Method 500 may be performed by processing logic that may comprise hardware (e.g., circuitry, dedicated logic, programmable logic, microcode, etc.), software (such as instructions run on a processing device), or a combination thereof. In one embodiment, method 500 is performed by invalid syllable check module 120 utilizing matrix 400 described with respect to FIGS. 1 and 4.

Method 500 begins at block 505 where Devanagari text is received for parsing in order to identify invalid syllables within the received text. In one embodiment, the Devanagari text is received from a computer application. Then, at block 510, the received text is divided into lines and words. Any algorithm suitable for identifying line and word breaks may be utilized to divide the text in embodiments of the invention. In one embodiment, let 'L' equal the line number and 'W' equal the word number.

At block 515, a state value and a character count value are initialized. For exemplary purposes, assume State=0 and CharCount=0. Then, at block 520, a Devanagari character type is determined for a next unexamined character in the text. In one embodiment, this next unexamined character is identified as Char[CharCount] and its character type is stored in a value CharType. Subsequently, at block 525, a matrix representing a Devanagari state machine is referenced with the current state value and current character type value (e.g., State and CharType).

At block 530, the state value is set to the value in the matrix at the row determined by the state value and the column determined by the character type value. In one embodiment, this would be equivalent to State=matrix[State][CharType]. At decision block 535, it is determined whether the new state value is equal to an invalid state. If so, then at block 540 an Invalid Syllable Signal is returned for the character at the current line and word value (L, W). In one embodiment, this signal is sent to the Identified Invalid Characters Storage 126, described with respect to FIG. 1, for storage until all of the text has been examined. In another embodiment, the Invalid Syllable Signal is sent directly to the application submitting the text in order to notify the end user of the application.

Method 500 then proceeds to block 545 where the character count value (e.g., CharCount) is incremented by one. At decision block 550, it is determined whether the new character count value is less than or equal to the present word length. If so, then the current word is still being examined and method 500 returns to block 520 to continue determining the state of the present word. If the new character count is greater than the present word length, then the entire word has been examined and method 500 proceeds to decision block 555 to determine whether this was the last word in the text.

If, at block 555, the text has not ended, then method 500 returns to block 515 to re-initialize the state and character count value for the next word in the text that has not been examined. However, if the text has ended at block 555, then method ends 560. As described above, method 500 returns the location of any invalid syllables in received Devanagari text at the occurrence of an invalid state (as defined by the state machine of embodiments of the invention) with a location at the particular line number and word number of the invalid state. Additionally, in some embodiments, a character number may also be used to identify the invalid syllable to an end user of the application.

Figure 6:
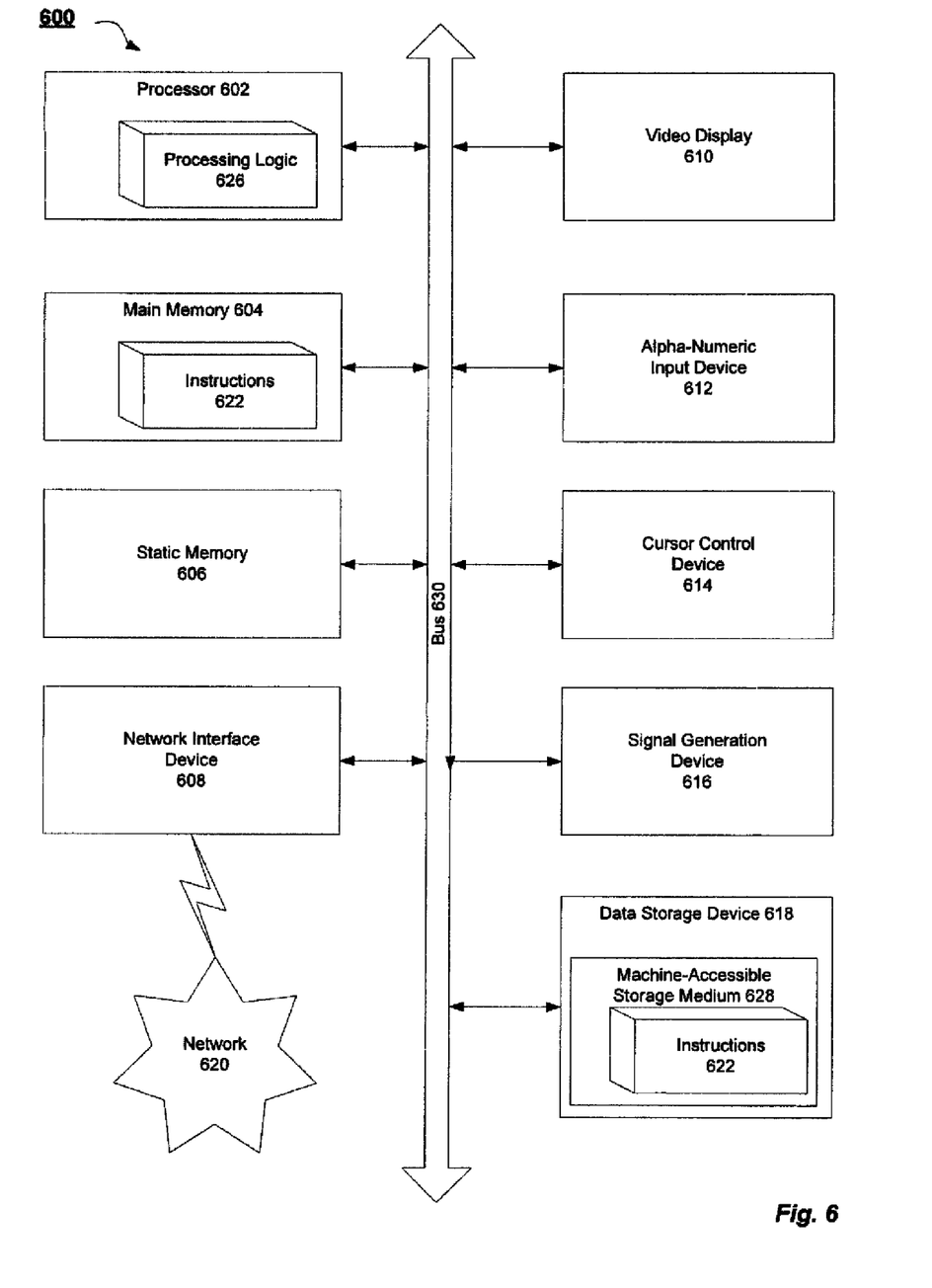
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored one or more set of instructions (e.g., software 622) embodying any one or more of the methodologies of functions described herein. The software 622 may also reside, completely or at least partially, within the main memory 604 and/or within the processing device 602 during execution thereof by the computer system 600; the main memory 604 and the processing device 602 also constituting machine-accessible storage media. The software 622 may further be transmitted or received over a network 620 via the network interface device 608.

The machine-readable storage medium 628 may also be used to store instructions to perform a method 400 to identify invalid Devanagari syllables as described with respect to FIG. 4, and/or a software library containing methods that call the above applications. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible Storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
    receiving, by a computing device, Devanagari text from an application of the computing device for parsing;
    dividing the received Devanagari text into lines and words identified with line numbers and word numbers;
    determining, by the computing device, a character type for a character of the Devanagari text;
    referencing, by the computing device, a matrix implementing a Devanagari state machine, the matrix referenced with the determined character type and a current state of the Devanagari text to produce a new state associated with the character;
    transmitting, by the computing device, an invalid syllable signal to the application for display on a display device to an end user of the application if the determined new state is invalid; and
    identifying the character in the invalid syllable signal by an associated line number and a word number if the determined new state is invalid.

2. The method of claim 1, wherein the Devanagari state machine comprises eight states including: initial, matra, vowel, vowel modifier, halant, nukta, consonant, and invalid.

3. The method of claim 2, wherein a validity of a first character of a word in the Devanagari text is determined by the initial state.

4. The method of claim 1, wherein the invalid syllable signal is stored by the computing device until all of the text is parsed.

5. The method of claim 4, wherein one or more stored invalid syllable signals are transmitted to the application for display to the end user after all of the text is parsed.

6. The method of claim 1, further comprising providing a suggestion to correct the character associated with the invalid syllable signal to the application.

7. A system, comprising:
    a memory;
    a processing device communicably coupled to the memory; and
    an invalid syllable check module executable from the memory by the processing device, the invalid syllable check module operable to:
        receive Devanagari text for parsing from an application executed from the processor and the memory;
        divide the received Devanagari text into lines and words identified with line numbers and word numbers;
        determine a character type for a character of the Devanagari text;
        reference a matrix implementing a Devanagari state machine, the matrix referenced with the determined character type and a current state of the Devanagari text to produce a new state associated with the character;
        transmit an invalid syllable signal to the application for display on a display device to an end user if the determined new state is invalid; and
        identify the character in the invalid syllable signal by an associated line number and a word number if the determined new state is invalid.

8. The system of claim 7, wherein the Devanagari state machine comprises eight states including: initial, matra, vowel, vowel modifier, halant, nukta, consonant, and invalid.

9. The system of claim 8, wherein the current state of a first character of a word in the Devanagari text is the initial state.

10. The system of claim 7, wherein the invalid syllable signal is stored by the computing device until all of the Devanagari text is parsed and then transmitted to the application for display to the end user.

11. The system of claim 7, wherein the invalid syllable check module further operable to provide a suggestion to correct the character associated with the invalid syllable signal to the application.

12. A non-transitory machine-readable storage medium including data that, when accessed by a machine, cause the machine to perform operations comprising:
    receiving, by a computing device, Devanagari text from an application of the computing device for parsing;
    dividing the received Devanagari text into lines and words identified with line numbers and word numbers;
    determining, by the computing device, a character type for a character of the Devanagari text;
    referencing, by the computing device, a matrix implementing a Devanagari state machine, the matrix referenced with the determined character type and a current state of the Devanagari text to produce a new state associated with the character;
    transmitting, by the computing device, an invalid syllable signal to the application for display on a display device to an end user of the application if the determined new state is invalid; and
    identifying the character in the invalid syllable signal by an associated line number and a word number if the determined new state is invalid.

13. The non-transitory machine-readable storage medium of claim 12, wherein the Devanagari state machine comprises eight states including: initial, matra, vowel, vowel modifier, halant, nukta, consonant, and invalid.

14. The non-transitory machine-readable storage medium of claim 13, wherein a validity of a first character of a word in the Devanagari text is determined by the initial state.

15. The non-transitory machine-readable storage medium of claim 12, wherein the invalid syllable signal is stored by the computing device until all of the text is parsed.

16. The non-transitory machine-readable storage medium of claim 15, wherein one or more stored invalid syllable signals are transmitted to the application for display to the end user after all of the text is parsed.

17. The non-transitory machine-readable storage medium of claim 12, wherein the data, when accessed by the machine, causes the machine to perform further operations comprising providing a suggestion to correct the character associated with the invalid syllable signal to the application.

\* \* \* \* \*